United States Patent [19]

Ikuta

[11] Patent Number: 5,308,021
[45] Date of Patent: May 3, 1994

[54] CENTRIFUGAL BRAKE MECHANISM FOR A FISHING REEL

[75] Inventor: Takeshi Ikuta, Sakai, Japan

[73] Assignee: Shimano Inc., Osaka, Japan

[21] Appl. No.: 909,764

[22] Filed: Jul. 7, 1992

[30] Foreign Application Priority Data

Jul. 10, 1991 [JP] Japan ............................. 3-52990[U]

[51] Int. Cl.⁵ .......................................... A01K 89/033
[52] U.S. Cl. ..................................................... 242/289
[58] Field of Search ....................... 242/289; 188/185; 182/234, 239

[56] References Cited

U.S. PATENT DOCUMENTS

| 2,482,863 | 9/1949 | Nelson | 188/185 |
| 4,209,141 | 6/1980 | Karlsson | 188/185 X |
| 4,601,438 | 7/1986 | Young | 242/289 |
| 4,919,362 | 4/1990 | Johansson | 242/289 X |

FOREIGN PATENT DOCUMENTS

| 924843 | 3/1955 | Fed. Rep. of Germany | 242/289 |
| 30-8116 | 11/1930 | Japan . | |
| 137333 | 9/1952 | Sweden | 242/289 |

Primary Examiner—Daniel P. Stodola
Assistant Examiner—Michael R. Mansen
Attorney, Agent, or Firm—Dickstein, Shapiro & Morin

[57] ABSTRACT

A centrifugal brake mechanism for a fishing reel has braking pieces radially displaceably disposed on a spool shaft or a rotating system interlocked with a spool, a friction member contactable by the braking pieces under a centrifugal force occurring with rotation of the spool, thereby applying a braking force to the spool, and a braking force adjusting device operable from outside a reel body for varying positions of a friction surface of the friction member for contacting the braking pieces along an axis of revolution of the braking pieces. The friction surface has varied coefficients of friction in a direction along the axis of revolution of the braking pieces.

8 Claims, 3 Drawing Sheets

CENTRIFUGAL BRAKE MECHANISM FOR A FISHING REEL

BACKGROUND OF THE INVENTION

1. Field of the Invention

This invention relates to a centrifugal brake mechanism for a fishing reel, and more particularly to an improvement in a centrifugal brake mechanism having radially displaceable braking pieces disposed on a spool shaft or a rotating system interlocked with a spool, and a friction member contactable by the braking pieces under a centrifugal force occurring with rotation of the spool, thereby applying a braking force to the spool rotation.

2. Description of the Related Art

A known brake mechanism as constructed above (hereinafter called a centrifugal brake) is disclosed in Japanese Patent Publication No. 1955-8116, for example. This centrifugal brake includes rod-like members extending radially of a spool shaft rotatable with a spool, tubular braking pieces slidably mounted on the rod-like members, and an annular friction member disposed outwardly of a locus of revolution of the braking pieces. When the spool rotates, the braking pieces move into contact with the friction member and a braking force based on the friction is applied to the spool rotation.

The above centrifugal brake applies the braking force reliably with rotation of the spool immediately after a bait casting action, and is often employed in existing baitcasting reels. To adjust the braking force of the known centrifugal brake, the reel body is disassembled to expose the brake and replace the braking pieces with those having a different coefficient of friction or a different weight.

On the other hand, lures and other baits are changed frequently in a fishing mode called bait casting. It is sometimes desirable to adjust the braking force after changing the baits.

This type of brake mechanism is intended for suppressing backlash at a casting time. The heavier the bait is, the stronger the braking force should be.

With the conventional centrifugal brake, however, adjustment of the braking force requires a troublesome operation as noted above. Moreover, the braking force is adjustable only stepwise, which makes it difficult to adjust the braking force with subtlety. Thus, there is room for improvement.

SUMMARY OF THE INVENTION

The object of the present invention is to provide an improved centrifugal brake mechanism whose braking force is adjustable without necessitating a troublesome operation.

The above object is fulfilled, according to the present invention, by a brake mechanism for a fishing reel comprising braking pieces included in a rotating system for contacting a friction member under a centrifugal force to apply a braking force to a spool, as noted in the outset hereof, wherein the friction member includes a friction surface having varied coefficients of friction in a direction along an axis of revolution of the braking pieces, and a braking force adjusting device is provided to be operable from outside a reel body for varying positions of the friction surface for contacting the braking pieces along the axis of revolution.

This brake mechanism has the following functions and effects:

The above features may be arranged as shown in FIG. 1, for example. When increasing the braking force, a braking force adjusting device A is operated to select a position of a friction surface 7S of a friction member 7 having a large coefficient of friction for contacting braking pieces 6. When decreasing the braking force, the braking force adjusting device A is reversed to obtain a desired braking force.

Thus, according to the present invention, a desired braking force is selected through an operation effected outside the reel body to vary a relative position between the braking pieces 6 and friction member 7, without replacing the braking pieces 6 and without changing braking characteristics of the centrifugal brake.

The present invention provides the improved centrifugal brake mechanism whose braking force is adjustable with a relatively simple operation.

Other features and advantages of the present invention will be apparent from the following description of the preferred embodiment.

DETAILED DESCRIPTION OF THE PREFERRED EMBODIMENT

A centrifugal brake mechanism for a fishing reel according to the present invention will be described in detail with reference to the drawings.

Figure 4:
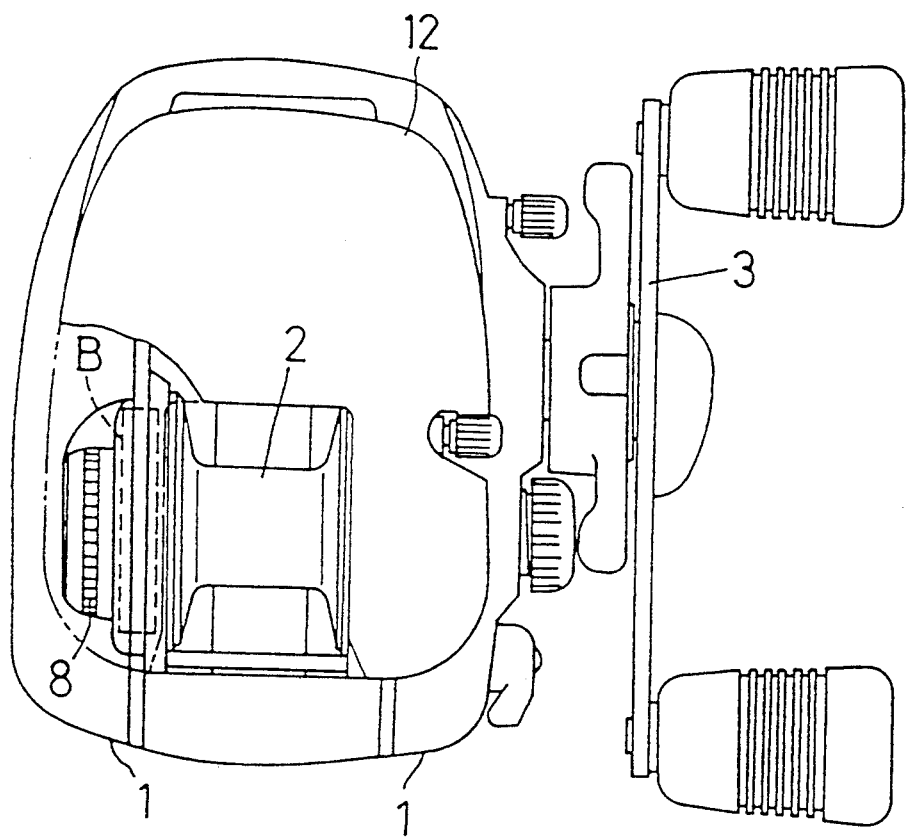
FIG. 4 is a plan view of a fishing reel.

FIG. 4 shows a baitcasting reel embodying the present invention. The reel comprises right and left side cases 1 constituting a reel body, and a spool 2 mounted between the side cases 1 for winding a fishing line (not shown). A handle 3 is disposed outwardly of the right side case 1, and a brake mechanism B is contained in the left side case 1.

The reel body includes a clutch mechanism (not shown) mounted in a transmission line for transmitting drive from the handle 3 to the spool 2.

Figure 1:
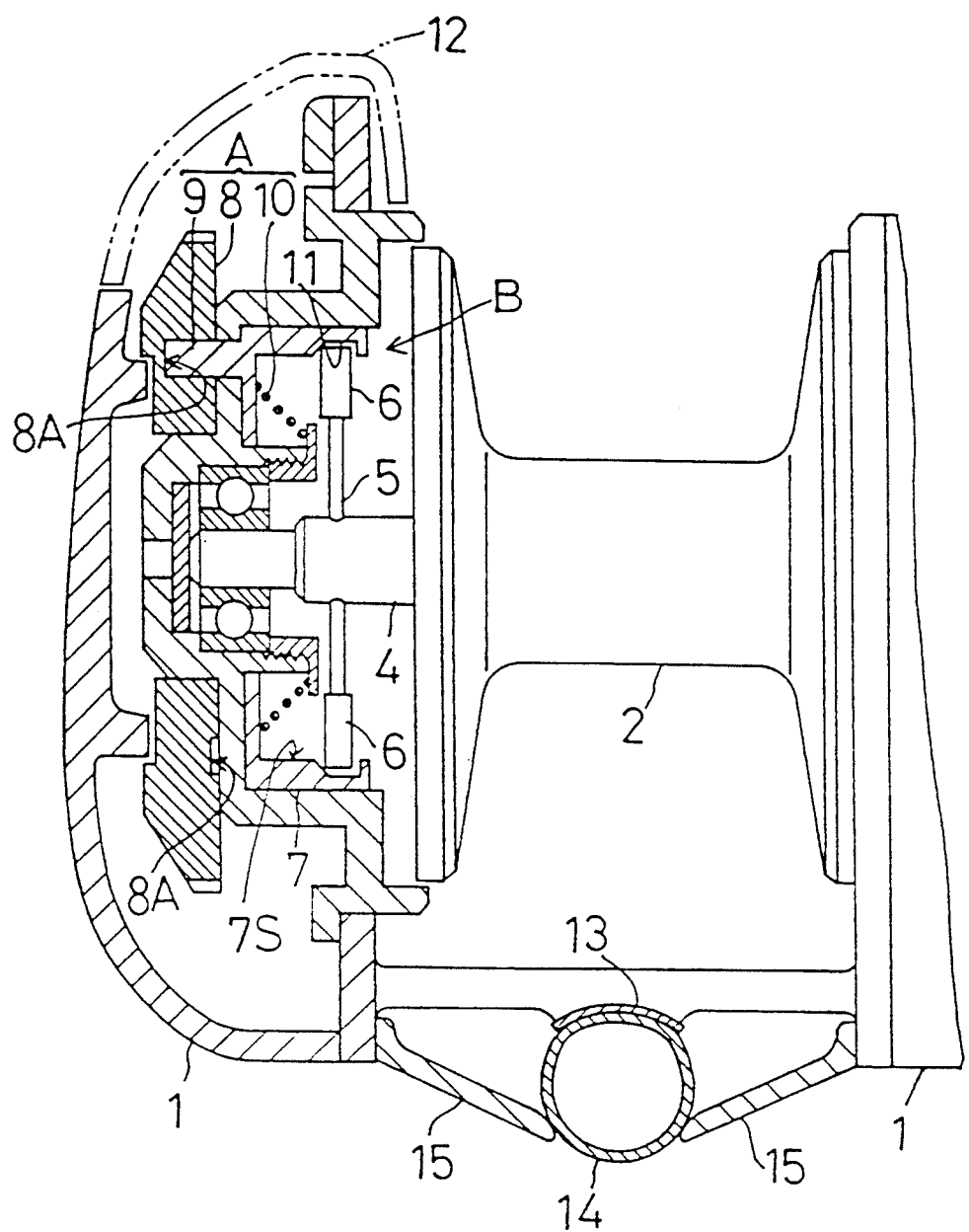
FIG. 1 is a rear view in vertical section showing a brake mechanism according to the present invention.
Figure 2:
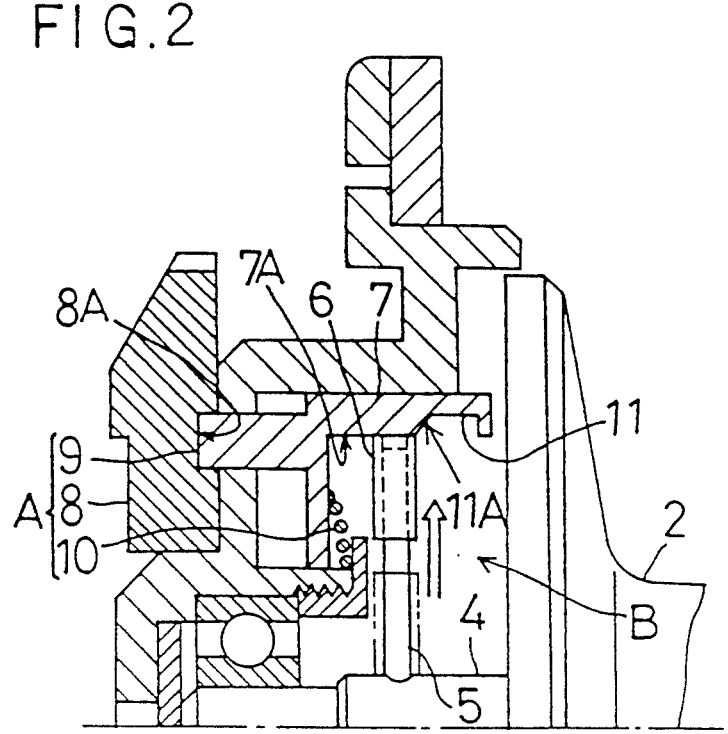
FIG. 2 is an enlarged sectional view of the brake mechanism.
Figure 3:
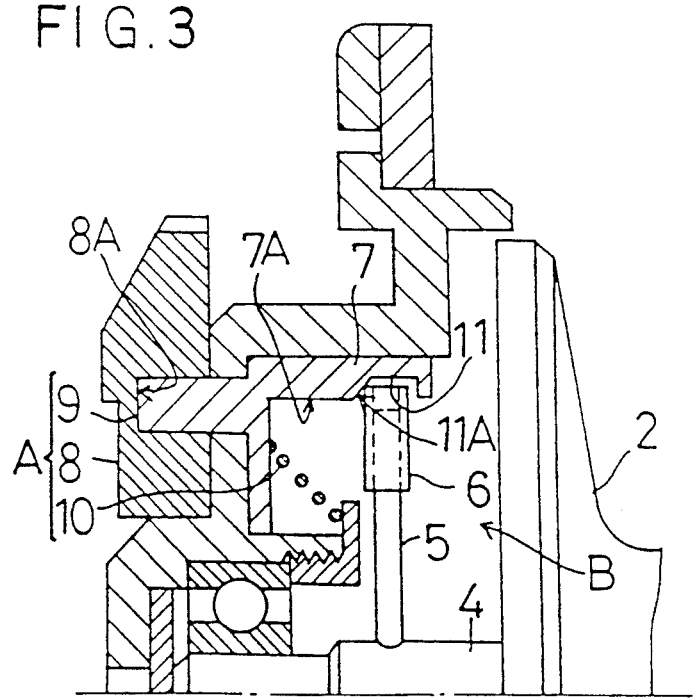
FIG. 3 is a sectional view of the brake mechanism in a position to provide a weak braking force.

As shown in FIGS. 1 through 3, the brake mechanism B includes rods 5 extending radially from an end of a spool shaft 4 rotatable with the spool 2, and tubular plastic braking pieces 6 slidably mounted on the rods 5, respectively. The brake mechanism B further includes an annular metallic friction member 7 disposed outwardly of a locus of revolution of the braking pieces 6. The friction member 7 defines a friction surface 7S having varied degrees of finishing precision axially of the spool shaft 4 to have different coefficients of friction. A braking force adjusting device A is provided to be operable from outside the reel body for changing positions of the friction surface 7S axially of the spool shaft 4 for contacting the braking pieces 6 to adjust braking force.

The braking force adjusting device A includes a dial 8 mounted in the left side case 1, a plurality of pins 9 fixed to the friction member 7 for engaging cam grooves 8A formed in the dial 8, and a spring 10 for biasing the friction member 7 away from the spool 2. For adjusting the braking force, the dial 8 is turned to displace the friction member 7 axially of the spool shaft 4, based on depths of the cam grooves 8A. Thus, the spool 2 is braked by a braking force corresponding to the coefficient of friction of the position of the friction surface 7S contacting the braking pieces 6.

In this brake mechanism B, the coefficient of friction of the friction surface 7S is varied continuously axially of the spool shaft 4, such that the coefficient of friction becomes the greater away from the spool 2 (leftward in FIG. 1). The friction surface 7S includes an annular groove 11 disposed adjacent the spool 2 (rightward in FIG. 1) and having an inclined surface 11A. When a bait is cast after setting the braking pieces 6 in position, the braking pieces 6 revolve on the rods 5 with peripheries of the braking pieces 6 contacting the inclined surface 11A of the groove 11 as shown in FIG. 3. This state produces a minimal braking force.

This fishing reel has a cover 12 covering an upper portion of the reel body and movable between an open position and a closed position. For adjusting the braking force as noted above, the cover 12 is opened to expose the dial 8. The fishing reel further comprises a lower mounting foot 13 for attaching to a fishing rod 14, and aiding members 15 formed of a soft material to fill gaps between the right and left side cases 1 and the fishing rod 14 to provide an improved palming touch.

The above embodiment may be modified by forming the braking pieces on a transmission system interlocked to the spool. The braking force adjusting system may be modified to displace the braking pieces relative to the friction member. The braking force adjusting device may be operable through varied mechanisms such as a screw mechanism and a gear mechanism, apart from the cam mechanism.

Friction surfaces having different coefficients of friction may be provided by a plurality of annular elements, such as of aluminum, steel, plastic and the like, arranged adjacent one another to have a common center coinciding with the center of revolution of the braking pieces. Coatings having different coefficients of friction may be applied to the friction surface of the friction member. Further, the friction member may have fine meshes defining a friction surface, with opening diameters or pitches varied continuously, thereby providing different coefficients of friction.

What is claimed is:

1. A centrifugal force brake mechanism for a fishing reel comprising:
   rods extending radially from a spool shaft rotatable with a spool;
   braking pieces slidably mounted on said rods and slidable in response to a centrifugal force;
   a cylindrical friction member disposed outwardly of a locus of revolution of said braking pieces, said cylindrical friction member being coaxial with said spool shaft, said friction member having a substantially cylindrical friction surface and an inclined surface; and
   braking force adjustment means operable from outside a reel body for changing the axial position of said friction member relative to said braking pieces, such that said braking pieces selectively come into contact with said friction surface and said inclined surface;
   wherein said braking pieces develop a frictional force when in contact with said friction surface, and wherein said braking pieces develop substantially no frictional force when in contact with said inclined surface.

2. A centrifugal brake mechanism as claimed in claim 1, wherein said braking pieces are formed of a plastic and have a tubular shape.

3. A centrifugal brake mechanism as claimed in claim 2, wherein said friction member is formed of metal.

4. A centrifugal brake mechanism as claimed in claim 1, wherein said braking force adjusting means includes a dial mounted in a side case, a plurality of pins fixed to said friction member for engaging cam grooves formed in said dial, and a spring for biasing said friction member away from said spool.

5. A centrifugal brake mechanism as claimed in claim 1, wherein said coefficients of friction of said friction surface are varied continuously axially of said spool to increase in a direction away from said spool.

6. A centrifugal brake mechanism as claimed in claim 1, wherein said friction member is formed of metal.

7. A centrifugal force brake mechanism for a fishing reel comprising:
   rods extending radially from a spool shaft rotatable with a spool;
   braking pieces formed of resin and each having a tubular shape, said braking pieces being slidably mounted on said rods and slidable in response to a centrifugal force;
   a cylindrical friction member formed of metal, said friction member being disposed outwardly of a locus of revolution of said braking pieces, said friction member being coaxial with said spool shaft, said friction member having a substantially cylindrical friction surface and an inclined surface;
   braking force adjustment means for changing the axial position of said friction member relative to said braking pieces, sand adjustment means including a dial mounted in a side case, said dial including cam grooves, and a plurality of pins fixed to said friction member and engageable with said cam grooves, and a spring for biasing said friction member away from said spool; and
   wherein said braking pieces develop a frictional force when in contact with said friction surface, and wherein said braking pieces develop substantially no frictional force when in contact with said inclined surface.

8. A centrifugal force brake mechanism for a fishing reel comprising:
   rods extending radially from a spool shaft rotatable with a spool;
   braking pieces formed of resin and each having a tubular shape, said braking pieces being slidably mounted on said rods and slidable in response to a centrifugal force;
   a cylindrical friction member formed of metal, said friction member being disposed outwardly of a locus of revolution of said braking pieces, said friction member being coaxial with said spool shaft, said friction member having a substantially cylindrical friction surface and an inclined surface;
   braking force adjustment means for changing the axial position of said friction member relative to said braking pieces, said adjustment means including a dial mounted in a side case, sand dial including cam grooves, and a plurality of pins fixed to said friction member and engageable with said cam grooves, and a spring for biasing said friction member away from said spool;
   wherein said braking pieces develop a frictional force when in contact with said friction surface, and wherein said braking pieces develop substantially no frictional force when in contact with said inclined surface.

* * * * *